United States Patent [19]

Imaizumo

[11] Patent Number: 4,875,560
[45] Date of Patent: Oct. 24, 1989

[54] DAMPING FORCE ADJUSTABLE HYDRAULIC SHOCK ABSORBER

[75] Inventor: Tomio Imaizumo, Kanagawa, Japan

[73] Assignee: Tokico Ltd., Kanagawa, Japan

[21] Appl. No.: 98,055

[22] Filed: Sep. 17, 1987

[30] Foreign Application Priority Data

Sep. 19, 1986 [JP] Japan .......................... 61-143531[U]
Sep. 20, 1986 [JP] Japan .......................... 61-144872[U]

[51] Int. Cl.$^4$ .......................... F16F 5/00; F16F 9/00; F16F 9/46; F16B 2/20
[52] U.S. Cl. ............................ 188/319; 188/299; 188/322.11; 267/195; 403/372
[58] Field of Search .............. 188/318, 319, 285, 299, 188/321.11, 322.12, 322.11; 267/195, 205, 136; 403/372, 365, 16

[56] References Cited

U.S. PATENT DOCUMENTS

| 3,010,743 | 11/1961 | Bengtson, Jr. .................. 403/10 |
| 4,476,967 | 10/1984 | Tetsuo ........................ 188/299 X |
| 4,660,688 | 4/1987 | Spisak et al. .............. 188/322.11 X |
| 4,712,708 | 12/1987 | Taguchi ...................... 403/372.1 X |
| 4,741,416 | 5/1988 | Tanigawa ...................... 188/299 |
| 4,756,393 | 7/1988 | Lolléc et al. ................. 188/299 |

FOREIGN PATENT DOCUMENTS

| 0086941 | 7/1980 | Japan .......................... 188/319 |
| 176179 | 8/1971 | Sweden ........................ 403/372 |
| 0898904 | 6/1962 | United Kingdom .............. 403/372 |
| 1128249 | 9/1968 | United Kingdom .............. 188/299 |
| 2123112 | 1/1984 | United Kingdom .............. 267/136 |
| 2143390 | 2/1985 | United Kingdom .............. 188/319 |

Primary Examiner—Andres Kashnikow
Assistant Examiner—Richard Potosnak
Attorney, Agent, or Firm—Wenderoth, Lind & Ponack

[57] ABSTRACT

A damping force adjustable hydraulic shock absorber includes a piston rod projecting from a cylinder and an actuator for adjusting the level of damping force generated in the shock absorber, the actuator having a bottom portion and an axially extending outer peripheral portion. The shock absorber further includes a casing and retaining device. The casing has a bottom portion secured to the projecting end portion of a piston rod, a first rising portion which extends upward from the outer peripheral edge of the bottom portion, a flange portion which extends outward from the upper end of the rising portion and on which is placed the bottom portion of the actuator, and a second rising portion which extends upward from the outer edge of the flange portion, the second rising portion receiving at least a part of the outer peripheral portion of the actuator to prevent horizontal movement of the actuator. The retaining device retains the actuator on the flange portion of the casing while preventing upward movement thereof. Accordingly, it is possible to readily secure the actuator to the projecting end of the piston rod and it is also possible to minimize the space for accommodating the actuator and hence to lower the height of a vehicle or the like.

3 Claims, 5 Drawing Sheets

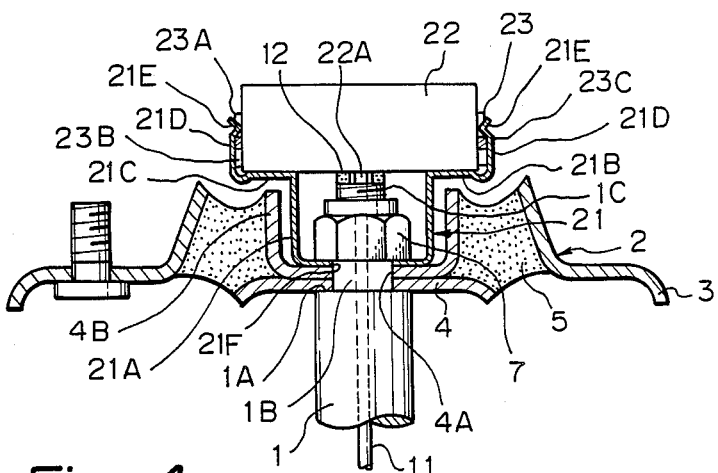
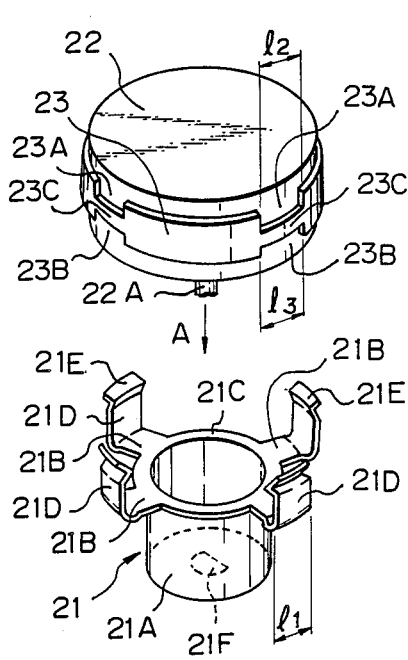

DAMPING FORCE ADJUSTABLE HYDRAULIC SHOCK ABSORBER

BACKGROUND OF THE INVENTION

1. Field of the Invention:

The present invention relates to a damping force adjustable hydraulic shock absorber. More particularly, the present invention pertains to a damping force adjustable hydraulic shock absorber which is so designed that it is possible to readily secure an actuator for adjusting the level of damping force to the projecting end of a piston rod, and it is also possible to minimize the space required for accommodating the actuator.

2. Description of the Related Art:

Referring to FIG. 1, which shows one example of conventional damping force adjustable hydraulic shock absorbers, reference numeral 1 denotes a piston rod projecting from a cylinder (not shown). The piston rod 1 has a smaller-diameter portion 1B provided at its projecting end and defining a shoulder portion 1A. An external thread portion 1C is formed on the distal end of the smaller-diameter portion 1B. The portion 1B has, for example, a D-shaped cross-sectional configuration so that the projecting end portion of the piston rod 1 is secured to a mount 2 (described later) in a detent or non-rotatable manner. The piston rod 1 has a bore (not shown) extending axially therethrough for receiving an adjusting rod 11 (described later).

The mount 2 which is employed to secure the projecting end portion of the piston rod 1 to the body of a vehicle consists of a vehicle body-side mounting member 3, a shock absorber-side mounting member 4, and a cushioning member 5 which is provided between the mounting members 3 and 4 and is connected integrally therewith by welding or other similar means. The shock absorber-side mounting member 4 is provided in its center with a fitting hole 4A which is able to fit with the smaller-diameter portion 1B of the piston rod 1. The mount 2 is fitted on the smaller-diameter portion 1B of the piston rod 1 through the fitting hole 4A and is fastened on the shoulder 1A by means of a nut 7 (described later). A cylindrical portion 4B is provided at the upper side of the mounting member 4, portion 4B extending upward in the axial direction of the piston rod 1. The upper end of the cylindrical portion 4B terminates at a position slightly below a step portion 6C of a casing 6 (described later).

The casing 6 is formed from a thick-walled metal plate, or the like, so as to serve as an actuator mounting bracket having the shape of a cylinder, one end of which is closed. The casing 6 consists of a bottom portion 6A defining the closed end, a smaller-diameter cylindrical portion 6B extending axially upward from the outer peripheral portion of the bottom portion 6A, the annular step portion 6C extending radially outward from the upper end portion of the smaller-diameter cylindrical portion 6B, a larger-diameter cylindrical portion 6D extending axially upward from the outer peripheral portion of the step portion 6C, and a flange portion 6E extending radially outward from the upper end portion of the larger-diameter cylindrical portion 6D. The bottom portion 6A is provided in its center with a fitting hole 6F which is able to fit with the smaller-diameter portion 1B of the piston rod 1. The casing 6 is fitted onto the smaller-diameter portion 1B of the piston rod 1 through the fitting hole 6F, provided in the bottom portion 6A, in such a manner that the external thread portion 1C of the piston rod 1 projects inside the smaller-diameter cylindrical portion 6B of the casing 6. The nut 7 is screwed on the external thread portion 1C of the piston rod 1 and is positioned within the smaller-diameter cylindrical portion 6B of the casing 6. The nut 7 fastens the bottom portion 6A of the casing 6 onto the shoulder 1A of the piston rod 1 through the mounting member 4 of the mount 2, thereby rigidly securing the casing 6 to the projecting end portion of the piston rod 1.

The reference numeral 8 denotes an actuator for adjusting the level of the damping force and is disposed inside the larger-diameter cylindrical portion 6D of the casing 6, in such a manner that the bottom of the actuator 8 is slightly spaced apart from the step portion 6C of the casing 6 as shown by the dimension $\Delta H$ in FIG. 1. Bracket 9 is provided integral with the outer periphery of the actuator 8, in such a manner that the bracket 9 projects radially outward. Bracket 9 is rigidly secured to the upper side of the flange portion 6E of the casing 6 through screws 10, thus securing the actuator 8 to the casing 6 in one unit. An output shaft 8A projects downward from the center of the bottom of the actuator 8, the output shaft 8A being appropriately rotated by the operation of the actuator 8, which is supplied with electric current from the outside, thereby adjusting the level of the damping force through the adjusting rod 11 (described later).

The adjusting rod 11 is rotatably received through the bore provided in the piston rod 1. The rod 11 is connected at its upper end to the output shaft 8A in such a manner that rod 11 is rotatable together with the output shaft 8A in one unit, the lower end of the rod 11 being connected to a shutter (not shown) for adjusting the level of damping force which is provided within the cylinder. Thus, the adjusting rod 11 transmits the rotational output derived from the output shaft 8A to the shutter so that the shutter is rotated, thereby appropriately adjusting the level of damping force generated within the cylinder. The reference numeral 12 denotes a seal member which is interposed between the bottom of the actuator 8 and the distal end face of the piston rod 1 in such a manner that the seal member 12 surrounds the output shaft 8A. The seal member 12 is formed in the shape of a ring so as to seal the area defined between the actuator 8 and the piston rod 1.

The following is a description of the operation of the prior art damping force adjustable hydraulic shock absorber having the above-described arrangement. To adjust the level of damping force generated within the cylinder, the actuator 8 is externally energized so that the shutter within the cylinder is appropriately rotated by the output shaft 8A of the actuator 8 through the adjusting rod 11. When the piston rod 1 expands or contracts vertically, the shock absorber-side mounting member 4 of the mount 2, the casing 6 and the actuator 8 move together with the piston rod 1 in one unit relative to the body-side mounting member 3 through the cushioning member 5. Therefore, it is general practice, in order to prevent the actuator 8 from colliding with the body-side mounting member 3, and a body-side panel 13 (the bonnet in the case of a shock absorber for a front wheel) or the like, to provide a predetermined clearance $h_1$ between the lower end of each screw 10 and the upper end of the body-side mounting member 3, and a predetermined clearance $h_2$ between the upper end of each screw 10 and the body-side panel 13.

The above-described prior art arrangement suffers, however, from the following problems. When the actuator 8 is to be mounted on the casing 6, the bracket 9 of the actuator 8 must be rigidly secured to the flange portion 6E of the casing 6 by means of a plurality of screws 10. Accordingly, much labor and time are needed to tighten the screws 10, which means that the operation of mounting the actuator 8 is exceedingly troublesome. Further, since the casing 6 is formed from a relatively thick metal plate for effectively retaining the actuator 8 through the screws 10, when the smaller-diameter cylindrical portion 6B of the casing 6 is formed by drawing or the like, the diameter (d) of the cylindrical portion 6B cannot be minimized.

Further, the outer diameter D of the flange portion 6E of the casing 6 and that of the bracket 9 are considerably larger than the outer diameter of the actuator 8, and it is necessary to provide the clearances $h_1$ and $h_2$ between the mount 2 and the screws 10 and between the body-side panel 13 and the screws 10, respectively. Therefore, if the plate thickness of the casing 6 and the space $\Delta h$ between the casing 6 and the actuator 8 are taken into consideration, the space H between the mount 2 and the body-side panel 13 must be increased. Accordingly, the space for accommodating the actuator 8 increases considerably, so that it is impossible to reduce the height of the vehicle.

FIG. 2 shows another example of conventional damping force adjustable hydraulic shock absorbers. Since the structure and operation of this prior art arrangement are the same as those of the above-described one except for the following, the same constituent elements as those of the foregoing prior art arrangement are denoted by the same reference numerals and description thereof is omitted.

In this prior art arrangement, a harness 18 is led out from the upper portion of the actuator 8, and the output shaft 8A, which is provided so as to project from the center of the bottom of the actuator 8, is appropriately rotated by energizing the actuator 8 through the harness 18, thereby adjusting the level of damping force through the adjusting rod 11.

The reference numeral 14 denotes a protective casing provided for protecting the actuator 8 from its surroundings. The casing 14 is formed in the shape of a cylinder having a relatively large diameter and having its upper end closed, and a mounting flange 14A is provided at the lower end of the casing 14 so as to project radially outward. The protective casing 14 is mounted through the flange 14A on the body-side mounting member 3 of the mount 2 in such a manner that the casing 14 surrounds the actuator 8 and the casing 6, and the flange 14A is rigidly secured to the mounting member 3 through bolts 15 and nuts 16. The numeral 17 denotes a grommet which is attached to the upper portion of the protective casing 14. The grommet 17 functions not only to pass the harness 18 through casing 14 but also to prevent rainwater from entering the protective casing 14 through the gap which would otherwise be present between the harness 18 and the peripheral edge of a hole provided in the casing 14 for passage of the harness.

More specifically, in the second prior art arrangement, the protective casing 14 is provided so as to surround the casing 6 and the actuator 8, and the grommet 17 is provided on the casing 14 to lead out the harness 18 therethrough. Accordingly, it is possible to prevent rainwater, muddy water, earth, sand or the like, from entering the protective casing 14, and it is therefore possible to protect the actuator 8 and the interior of the casing 6 from their surroundings.

However, the second prior art arrangement also suffers from the following problems. To secure the actuator 8 to the projecting end portion of the piston rod 1, the casing 6 is first secured by means of the nut 7 and then the bracket 9 of the actuator 8 must be secured to the flange portion 6E of the casing 6 through the screws 10. Accordingly, much labor and time are needed to tighten the screws 10, and the operation of securing the actuator 8 is therefore considerably troublesome.

In addition, since the actuator 8 and its associated members are protected by the protective casing 14, it is necessary to ensure at the upper side of the mount 2 a disadvantageously large space for accommodating the protective casing 14 in addition to the space for the actuator 8, and it is impossible to minimize this accommodating space. Further, since the protective casing 14 is formed in the shape of a cylinder having a relatively large diameter, the material cost is increased, and the casing 14 must be secured to the body-side mounting member 3 of the mount 2 by using the bolts 15 and the nuts 16. Thus, this prior art arrangement suffers from inferior working efficiency and increased production cost.

SUMMARY OF THE INVENTION:

In view of the above-described disadvantages of the prior art, it is a primary object of the present invention to provide a damping force adjustable hydraulic shock absorber which is so designed that it is possible to readily secure the actuator to the projecting end of the piston rod and it is also possible to minimize the space for accommodating the actuator and hence to lower the height of a vehicle or the like.

To this end, the present invention provides a damping force adjustable hydraulic shock absorber comprising: a piston rod projecting from a cylinder; an actuator for adjusting the level of damping force generated in the shock absorber, the actuator having a bottom portion and an axially extending outer peripheral portion; a casing including a bottom portion secured to the projecting end portion of the piston rod, a first rising portion which extends upward from the outer peripheral edge of the bottom portion, a flange portion which extends outward from the upper end of the rising portion and on which is placed the bottom portion of the actuator, and a second rising portion which extends upward from the outer edge of the flange portion, the second rising portion receiving at least a part of the outer peripheral portion of the actuator to prevent horizontal movement of the actuator; and retaining means including an elastically deformable retaining member and an engagement member which is engageable with the retaining member, the retaining means retaining the actuator on the flange portion of the casing while preventing upward movement thereof, either the retaining member or the engagement member being provided on the casing.

The above and other objects, features and advantages of the present invention will become more apparent from the following description of preferred embodiments thereof taken in conjunction with the accompanying drawings.

BRIEF DESCRIPTION OF THE DRAWINGS:

FIG. 3 is a fragmentary sectional view of a damping force adjustable hydraulic shock absorber according to a first embodiment of the present invention;

FIG. 4 is a perspective exploded view showing the way in which an actuator and a bracket which are shown in FIG. 3 are assembled together;

FIG. 5 is a fragmentary perspective view of an actuator and a band in accordance with a second embodiment of the present invention;

Figure 1:
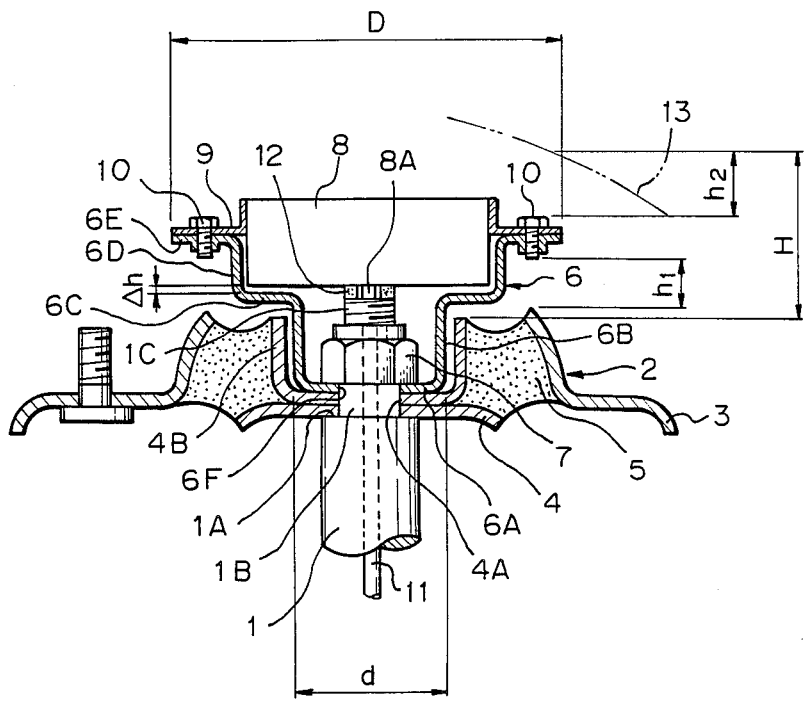
FIG. 1 is a fragmentary sectional view of a damping force adjustable hydraulic shock absorber according to one prior art arrangement.
Figure 2:
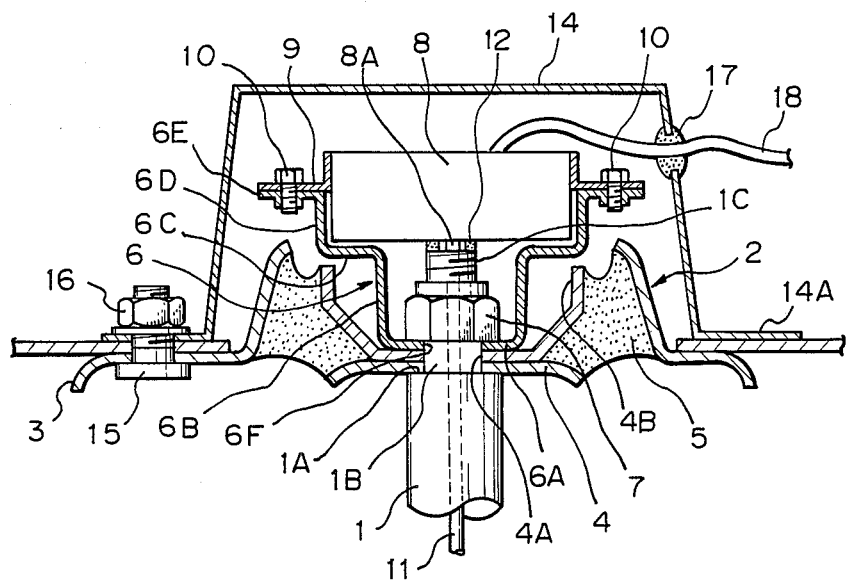
FIG. 2 is a fragmentary sectional view of a damping force adjustable hydraulic shock absorber according to another prior art arrangement.

DESCRIPTION OF THE PREFERRED EMBODIMENTS:

Preferred embodiments of the present invention will be described hereinunder in detail with reference to the accompanying drawings. It should be noted that the same constituent elements of the embodiments as those of the above-described prior arts arrangement shown in FIGS. 1 and 2 are denoted by the same reference numerals and description thereof is omitted.

FIGS. 3 and 4 show in combination a first embodiment of the present invention.

In these figures, the reference numeral 21 denotes a bracket which is provided at the projecting end of the piston rod 1. The bracket 21 is formed from a thin-walled plate material such as spring steel with a view to imparting resilience to each of a plurality of retaining portions 21D. As shown in FIG. 4, the bracket 21 comprises a fixed portion 21A which defines the lower portion of the bracket 21 and which is formed in the shape of a cylinder one end of which is closed, a support portion 21C which extends radially outward from the open end of the fixed portion 21A and which has four arm portions 21B projecting in the shape of, for example, a cross, and retaining portions 21D which extend axially upward from the respective distal ends of the arm portions 21B of the support portion 21C, each retaining portion 21D being bent so as to have a substantially L-shaped cross-section. An engagement projection 21E having a predetermined width $l_1$ is formed at the upper end of each retaining portion 21D, the projection 21E projecting radially inward in the shape of a V. A fitting hole 21F having a substantially D-shaped cross-section is provided in the bottom of the fixed portion 21A of the bracket 21. Thus, the fixed portion 21A is fitted on the smaller-diameter portion 1B of the piston rod 1, through the fitting hole 21F, and then rigidly secured to the shoulder portion 1A through the mounting member 4 by means of the nut 7.

The reference numeral 22 denotes an actuator for adjusting the level of damping force and which is to be mounted on the bracket 21. The actuator 22 has substantially the same configuration as the actuator 8 explained above during the description of the prior art arrangements. More specifically, the actuator 22 is arranged such that an output shaft 22A, which projects from the bottom, is activated to rotate the adjusting rod 11. The numeral 23 denotes a band which is rigidly secured to the outer periphery of the actuator 22 by spot welding or other similar means. The band 23 is formed from a metal plate or the like in the shape of an endless narrow band. The band 23 has four engagement grooves 23A and four guide grooves 23B which are respectively provided along the upper and lower edges of the band 23 at intervals of, for example, about 90 degrees in the circumferential direction, the grooves 23A and 23B serving as engagement portions. Each engagement groove 23A and each guide groove 23B are formed by cutting the upper and lower edges, respectively, of the band 23 in the shape of a U with predetermined widths $l_2$ and $l_3$ in the circumferential direction. As a result, a narrow portion 23C is defined between each pair of engagement and guide grooves 23A and 23B.

The width $l_2$ of each engagement groove 23A is set so as to be substantially equal to the width $l_1$ of the engagement projection 21E of each retaining portion 21D so that the engagement projection 21E is engageable in the engagement groove 23A. The width $l_3$ of each guide groove 23B is set so as to be equal to, or slightly larger than the width $l_1$ of each engagement projection 21E. When the actuator 22 is forced into the bracket 21 in the direction of the arrow A in FIG. 4, so that the actuator 22 is mounted in the accommodating space defined between the retaining portions 21D of the bracket 21, the engagement projection 21E of each retaining portion 21D is guided by one of the guide grooves 23B of the band 23 so as to ride over the narrow portion 23C and is eventually engaged in the engagement groove 23A. At the same time, the bottom of the actuator 22 is placed on the support portion 21C of the bracket 21. Thus, the actuator 22 is secured at the projecting end of the piston rod 1.

The basic operation of the damping force adjustable hydraulic shock absorber in accordance with this embodiment, having the above-described arrangement, is not particularly different from that of the prior art arrangements.

However, since the bracket 21 in this embodiment is formed from a thin plate material such as spring steel, when the fixed portion 21 having the shape of a cylinder, one end of which is closed, is formed by drawing or other similar means, it is possible to minimize the diameter of the fixed portion 21A, and consequently to reduce the diameter of the cylindrical portion 4B of the shock absorber-side mounting member 4.

Further, in this embodiment the resilient retaining portions 21D are provided at the upper end of the bracket 21 in diametrically opposing relation to each other, and the engagement projections 21E project radially inward from the upper ends of the respective retaining portion 21D. In addition, the band 23 is rigidly secured to the outer periphery of the actuator 22, and the band 23 is provided with the engagement and guide grooves 23A and 23B at the upper and lower sides, respectively, of the narrow portions 23C, the engagement grooves 23A being engageable with the engagement projections 21E, and the guide grooves 23B guiding the projections 21E. Therefore, when the actuator 22 is forced into the accommodating space defined between the retaining portions 21D with the output shaft 22A of the actuator 22 aligned with the upper end of the adjusting rod 11 and with the engagement projection 21E of each retaining portion 21D being inserted into a respective of the guide grooves 23B, the engagement projection 21E is guided by the guide groove 23B so as to ride over the narrow portion 23C, and is eventually engaged in the engagement groove 23A. Thus, it is possible to secure the actuator 22 on the bracket 21 in a single and simple operation.

In the above-described mounting operation, the bottom of the actuator 22 is supported on the support portion 21C of the bracket 21, and each narrow portion 23C of the band 23 is pressed downwardly by the engagement projection 21E which is engaged in the corresponding engagement groove 23A. Therefore, it is possible to position the actuator 22 in the axial direction and also in the direction of rotation by virtue of the engagement in the engagement grooves 23A of the engagement projections 21E. Thus, it is possible to reliably prevent generation of play or chattering between the actuator 22 and the bracket 21. In addition, since the engagement projections 21E are guided by the guide grooves 23B of the band 23 and then are engaged in the engagement grooves 23A, it is possible to simplify the operation of mounting the actuator 22 by a large margin, and it is also possible to readily engage the output shaft 22A of the actuator 22 with the upper end portion of the adjusting rod 11 so that the output shaft 22A and the adjusting rod 11 are rotatable together in one unit.

Further, since in this embodiment the flange portion 6E of the casing 6 and the bracket 9 need not be formed so as to project in the radial direction, as in the case of the prior art arrangements shown in FIGS. 1 and 2, it is unnecessary to take into consideration the clearance $h_1$ and the like, and it is possible to reduce the heightwise space H and hence the space for accommodating the actuator 22. Thus, it becomes possible to lower the height of the vehicle. Since there is no need for the screws 10, it is advantageously possible to improve the working efficiency at the time of mounting the actuator 22 and also lower the production cost.

FIG. 5 shows a second embodiment of the present invention. It should be noted that the same constituent elements of this embodiment as those of the first embodiment are denoted by the same reference numerals, and description thereof is omitted.

The feature of this embodiment resides in that each of the guide grooves 31B provided in a band 31, which is rigidly secured to the outer periphery of the actuator 22, is tapered upwardly with a view to enabling the engagement projections 21E to be effectively guided into the engagement grooves 31A by the guide grooves 31B. The band 31 has substantially the same structure as that of the band 23 explained in the description of the first embodiment. More specifically, a narrow portion 31C is defined between each pair of engagement and guide grooves 31A and 31B.

The second embodiment arranged as described above provides functional effects which are substantially similar to those offered by the first embodiment. However, since in this embodiment the guide grooves 31B are tapered, it is possible to even more effectively guide the engagement projections 21E into the engagement grooves 31A by the guide grooves 31B, and it is therefore possible to further simplify the operation of mounting the actuator 22.

Figure 6:
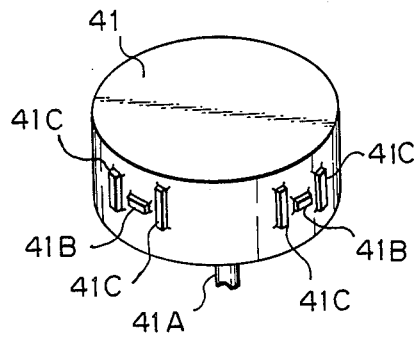
FIG. 6 is a perspective view of an actuator in accordance with a third embodiment of the present invention.

FIG. 6 shows a third embodiment of the present invention. It should be noted that the same constituent elements of this embodiment as those of the first embodiment are denoted by the same reference numerals, and description thereof is omitted.

The feature of this embodiment resides in that an actuator 41 is provided on its outer peripheral surface with four sets of projections at intervals of, for example, about 90 degrees, each set consisting of a horizontal projection 41B and a pair of vertical projections 41C which are arranged in a substantially H-shaped pattern. The actuator 41 has substantially the same arrangement as that of the actuator 22, explained in the description of the first embodiment, that is, the actuator 41 has an output shaft 41A projecting from its bottom. Each pair of vertical projections 41C are spaced apart from each other at a distance which is, for example, substantially equal to the dimension $l_2$ shown in FIG. 4. The area which is defined between the pair of vertical projections 41C and the lower side of the horizontal projection 41B defines a guide portion for guiding one of the engagement projections 21E, while the area which is defined between the pair of vertical projections 41C and the upper side of the horizontal projection 41B defines an engagement portion which is engageable by the engagement projection 21E. Thus, each engagement projection 21E is guided by one pair of vertical projections 41C and eventually is engaged with the upper side of the horizontal projection 41B. In this engaged state, the engagement projection 21E is prevented, by the horizontal projection 41B, from disengaging in the axial direction and is also locked between the vertical projections 41C from moving in the rotational direction.

Thus, the third embodiment having the above-described arrangement provides functional effects which are substantially similar to those offered by the first embodiment, and this embodiment particularly makes it unnecessary to provide the band 23 (31) employed in each of the above-described embodiments.

It should be noted that, although in the third embodiment one horizontal projection 41B is provided on the outer peripheral surface of the actuator 41 so as to be positioned between each pair of vertical projections 41C, a horizontal recess may be formed in the outer peripheral surface of the actuator 41 in place of the horizontal projection 41B. In this case, the engagement projections 21E are engaged with the recesses, respectively, to thereby prevent the actuator 41 from disengaging and also from rotating. Each pair of vertical projections 41C may be formed in such a manner that the portions thereof which are located below the horizontal projection 41B or the recess define an upwardly tapering guide portion therebetween which is similar to the guide groove 31B shown in FIG. 5.

Although in the above-described embodiments the engagement projections 21E are provided on the retaining portions 21D of the bracket 21, the arrangement may be such that engagement recesses are provided in the bracket 21 in place of the engagement projections 21E and projections which are engageable with the engagement recesses are provided on the actuator 22 (41).

A fourth embodiment of the present invention will next be described with reference to FIGS. 7 to 9. It should be noted that the same constituent elements of this embodiment as those of the first embodiment are denoted by the same reference numerals, and description thereof is omitted.

Figure 8:
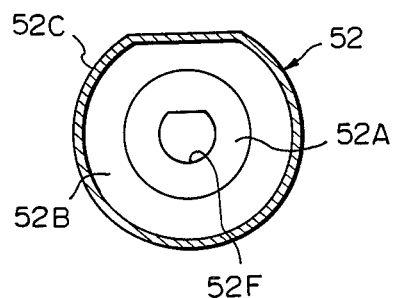
FIG. 8 is a sectional view taken along the line VIII—VIII of FIG. 7, and illustrating the casing shown in FIG. 7.
Figure 9:
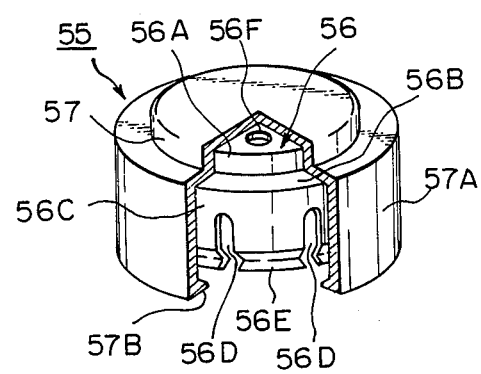
FIG. 9 is a partially-cutaway perspective view of a closure shown in FIG. 7.
Figure 7:
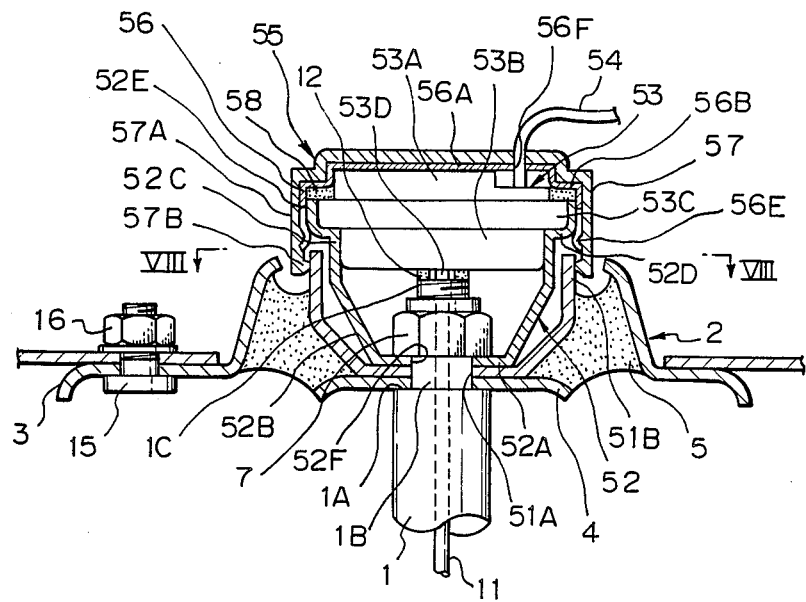
FIG. 7 is a fragmentary sectional view of a damping force adjustable hydraulic shock absorber according to a fourth embodiment of the present invention.

In FIGS. 7 to 9, the reference numeral 4 denotes a shock absorber-side mounting member which constitutes the mount 2 in combination with the body-side mounting member 3 and the cushioning member 5. The mounting member 4 has substantially the same structure as that of the mounting member explained in the description of the prior art. More specifically, the mounting member 4 is provided with a fitting hole 51A and a cylindrical portion 51B. In this embodiment, the cylindrical portion 51B is formed so as to project axially upward beyond the upper ends of the body-side mounting member 3 and the cushioning member 5 by a predetermined dimension. A lip portion 57B of a cover 57 (described later) is slidably fitted on the outer periphery of the upper end portion of the cylindrical portion 51B with a predetermined interference fit therebetween.

The reference numeral 52 denotes a casing, serving also as an actuator mounting bracket, which is formed in the shape of a cylinder, one end of which is closed. The casing 52 consists of a bottom portion 52A defining the closed end, a tapered portion 52B which extends cylindrically from the outer peripheral portion of the bottom portion 52A at a predetermined angle of inclination so that its diameter gradually increases, a smaller-diameter cylindrical portion 52C which extends axially upward from the upper end of the tapered portion 52B and which has a substantially D-shaped cross-sectional configuration as shown in FIG. 8, an annular step portion 52D which extends radially outward from the upper end of the smaller-diameter cylindrical portion 52C, and a larger-diameter cylindrical portion 52E which extends axially upward from the outer peripheral portion of the step portion 52D and which has a height corresponding to the height of an enlarged-diameter step portion 53C of an actuator 53 (described later). The bottom portion 52A is provided in its center with a substantially D-shaped fitting hole 52F which is able to fit with the smaller-diameter portion 1B of the piston rod 1. The casing 52 is secured on the shoulder portion 1A of the piston rod 1 through the shock absorber-side mounting member 4, by means of the nut 7, in the same way as in the case of the casing 6, explained in the description of the prior art.

The actuator 53, used to adjust the level of damping force, is inserted into the casing 52 from the larger-diameter cylindrical portion side. The actuator 53 has the enlarged-diameter step portion 53C provided between upper and lower portions 53A, 53B, the step portion 53C being supported at its lower side on the step portion 52D of the casing 52. The lower portion 53B of the actuator 53 is formed so as to have a substantially D-shaped cross-sectional configuration, in conformity with the inner peripheral configuration of the smaller-diameter cylindrical portion 52C of the casing 52. Thus, the lower portion 53B of the actuator 53 is received within the smaller-diameter cylindrical portion 52C of the casing 52 in such a manner that it is possible to prevent the lower portion 53B from rotating. An output shaft 53D, which is to be coupled to the adjusting rod 1, projects from the center of the bottom of the lower portion 53B. The seal member 12 is interposed between the bottom surface of the lower portion 53B and the distal end face of the piston rod 1 in such a manner as to surround the output shaft 53D. Numeral 54 denotes a harness which is led out from the upper portion 53A of the actuator 53. The actuator 53 is energized through the harness 54 to rotate the output shaft 53D.

The reference numeral 55 denotes a closure which is fitted on the larger-diameter cylindrical portion 52E of the casing 52 in order to secure the actuator 53 between the same and the casing 52. The closure 55 is formed in the shape of a stepped cylinder from a metallic sheet material, or the like. The closure 55 is composed of a closure body 56 which is provided at its upper end with a circular dish-shaped hood portion 56A so as to cover the upper portion 53A of the actuator 53, and the cover 57 which is formed from a rubber or plastic material so as to be integral with both the upper end and outer peripheral portions of the closure body 56. As shown in FIG. 9, the closure body 56 consists of the hood portion 56A, an annular step portion 56B which extends radially outward from the lower end of the hood portion 56A, an enlarged-diameter portion 56C which extends axially downward from the outer peripheral portion of the step portion 56B in the shape of a cylinder and which is to be fitted on the outer periphery of the larger-diameter cylindrical portion 52E of the casing 52, and retaining portions 56E which are defined by the lower portion of the enlarged-diameter portion 56C in such a manner that the diameter of a circle which is defined by the retaining portions 56E is free to be reduced and enlarged through axially extending slits 56D which are formed in the lower portion of the enlarged-diameter portion 56C, the lower end of each retaining portion 56E being bent radially inward so as to have a substantially V-shaped cross-section. Thus, the retaining portions 56E are disengageably engaged with the outer peripheral portion of the step portion 52D of the casing 52. The hood portion 56A is provided with a small hole 56F for leading out the harness 54.

The cover 57 is in close contact with the outer peripheral surface of the closure body 56 so as to cover it, and the lower portion of the cover 57 defines a cylindrical portion 57A which projects axially downward beyond the lower ends of the retaining portions 56E by a predetermined dimension. The annular lip portion 57B projects inward from the inner periphery of the lower end portion of the cylindrical portion 57A. The lip portion 57B is fitted on the outer periphery of the cylindrical portion 51B of the shock absorber-side mounting member 4 with a predetermined interference fit, thereby preventing rainwater, muddy water or the like from entering the inside of the casing 52 through the gap which might otherwise be present between the cover 57 and the mounting member 4. Thus, when the closure 55 is fitted on the casing 52, the retaining portions 56E of the closure body 56 are engaged with the outer peripheral portion of the step portion 52D of the casing 52, and the enlarged-diameter step portion 53C of the actuator 53 is thereby clamped between the step portion 56B of the closure body 56 and the step portion 52D of the casing 52 through a seal member 58 (described later). Thus, the actuator 53 is rigidly secured. At this time, the lip portion 57B of the cover 57 is tightly fitted on the outer periphery of the upper end portion of the cylindrical portion 51B so that liquid-tight sealing is provided therebetween. The cover 57 provides liquid-tight sealing for the harness 54 at the upper side of the small hole 56F in the closure body 56.

The seal member 58 is interposed between the step portion 56B of the closure body 56 on the one hand and the upper surface of the step portion 53C of the actuator 53 and the end face of the larger-diameter cylindrical portion 52E of the casing 52 on the other. The seal member 58 is formed in the shape of a thin ring from a resilient member such as a rubber material to seal the gap between the end face of the larger-diameter cylindrical portion 52E and the step portion 56B. When the retaining portions 56E of the closure body 56 are engaged with the outer peripheral portion of the step portion 52D, the seal member 58 is slightly resiliently compressed so as to press the actuator 53 against the step portion 52D of the casing 52 with a predetermined load to thereby prevent generation of play or chattering between the actuator 53 and the casing 52.

The basic operation of the damping force adjustable hydraulic shock absorber according to this embodiment, having the above-described arrangement, is not particularly different from that of the first embodiment.

Since in this embodiment the closure 55 is employed to secure the actuator 53 between the same and the casing 52, it is possible to reliably clamp the enlarged-diameter step portion 53C of the actuator 53 between the step portion 56B of the closure body 56 and the step portion 52D of the casing 52 through the seal member 58 simply by engaging the retaining portions 56E of the closure body 56 with the outer peripheral portion of the step portion 52D of the casing 52, thus enabling the actuator 53 to be readily secured at the projecting end of the piston rod 1. In this case, the lower portion 53B of the actuator 53 has a substantially D-shaped cross-section in conformity with the smaller-diameter. cylindrical portion 52C of the casing 52. Therefore, it is possible to reliably prevent the actuator 53 from rotating by means of the casing 52.

In addition, the area between the actuator 53 and the distal end of the piston rod 1 is sealed by the seal member 12, while the area between the cover 57 of the closure 55 and the cylindrical portion 51B of the shock absorber-side mounting member 51 is sealed through the lip portion 57B, and the area between the harness 54 and the peripheral edge of the small hole 56F in the closure body 56 is sealed by the cover 57. Further, the area between the step portion 56B of the closure body 56 and the end face of the larger-diameter cylindrical portion 52E of the casing 52 is sealed by the seal member 58. Therefore, it is possible to seal the area between the actuator 53 and the projecting end of the piston rod 1, which projects within the casing 52, with a double or triple sealing structure, so that it is possible to reliably prevent rainwater or muddy water from entering the inside of the casing 52. Since the actuator 53 is accommodated in the space which is defined between the casing 52 and the closure 55, the actuator 53 is reliably protected from its surroundings, and it is therefore unnecessary to provide the protective casing 14 employed in the prior art arrangement shown in FIG. 2. Accordingly, it is possible to reduce the actuator accommodating space by a large margin and also to lower the production cost advantageously.

It should be noted that, although in the above-described embodiment the seal member 58 is interposed between the end face of the larger-diameter cylindrical portion 52E of the casing 52 and the upper surface of the step portion 53C of the actuator 53 on the one hand and the step portion 56B of the closure body 56 on the other, the seal member 58 may be rigidly secured to the lower surface of the step portion 56B of the closure body 56 by means, for example, of bonding. It is also possible to employ a coned disk spring or other similar means in place of the seal member 58 so that the spring may be elastically deformed between the step portion 56B and the upper surface of the step portion 53C of the actuator 53 to thereby prevent generation of play or chattering between the actuator 53 and the casing 52.

Although in the above-described embodiment the closure 55 is composed of the closure body 56 and the cover 57 which covers the outer surface of the closure body 56, the cover 57 provided on the outer surface of the closure body 56 may be omitted since the area between the step portion 56B of the closure body 56 and the end face of the larger-diameter cylindrical portion 52E of the casing 52 is sealed by means of the seal member 58. In this case, it is preferable to provide a grommet or the like in the small hole 56F in the closure body 56 to seal the gap between the harness 54 and the peripheral edge of the hole 56F.

Further, although in the above-described embodiment the retaining portions 56E provided on the body 56 of the closure 55 are disengageably engaged with the outer peripheral portion of the step portion 52D of the casing 52, the arrangement may be such that a recess or a projection is provided on the outer peripheral surface of the larger-diameter cylindrical portion 52E of the casing 52, while a projection or a recess which is engageable with such recess or projection is provided on each retaining portion 56E, whereby the closure 55 and the casing 52 are disengageably engaged with each other by virtue of the engagement between the projection and recess.

Although the present invention has been described by specific terms, it should be noted here that the described embodiments are not necessarily exclusive and various changes and modifications may be imparted thereto without departing from the scope of the invention which is limited solely by the appended claims.

What is claimed is:

1. A damping force adjustable hydraulic shock absorber assembly comprising:
   a piston rod to be projected from a cylinder of a shock absorber;
   an actuator for adjusting the level of damping force in the shock absorber, said actuator having a bottom portion and an axially extending outer peripheral portion;
   a casing including a bottom portion secured to the projecting end portion of said piston rod, a first rising portion which extends upward from the outer peripheral edge of said bottom portion, a flange portion which extends outward from the upper end of said rising portion, said bottom portion of said actuator being placed on said flange portion, and a second rising portion which extends upward from the outer edge of said flange portion, said second rising portion receiving at least a part of the outer peripheral portion of said actuator to prevent horizontal movement of said actuator;
   said second rising portion of said casing including at least one retaining portion which is resiliently deformable in a radial direction of said casing and having a projection projecting inwardly thereof;
   said actuator being provided on the outer periphery thereof with a ring-shaped engaging member projecting outwardly from said outer periphery;
   said engaging member being engageable with said retaining portion by engagement of said projection of said retaining portion with an upper edge of said ring-shaped engaging member to retain said actuator on said flange portion of said casing while preventing upward movement of said actuator relative to said flange portion; and said retaining portion and said engaging member being formed such that, as said actuator is pressed into said casing, said retaining portion is first deformed outwardly so that said projection is resiliently moved outwardly over said ring-shaped engaging member and then moves back inwardly when said projection passes said upper edge of said engaging member so that said projection engages with said upper edge.

2. A damping force adjustable hydraulic shock absorber assembly according to claim 1, wherein said second rising portion of said casing has a plurality of said retaining portions which are circumferentially spaced apart from each other, and said engaging member has a plurality of engagement portions which are circumferentially spaced apart from each other.

3. A damping force adjustable hydraulic shock absorber assembly according to claim 2, wherein said engagement portions are engageable with respective of said retaining portions and respective of a plurality of guide portions which are provided in alignment with respective said engagement portions in the axial direction of said actuator so as to guide said retaining portions.

* * * * *